United States Patent [19]

Janz et al.

[11] 4,404,709

[45] Sep. 20, 1983

[54] FASTENING DEVICE FOR HANDLES, ARMS RESTS ETC. ON THE WALL OF A VEHICLE, OR THE LIKE

[75] Inventors: Joachim Janz; Ulrich Svejkovsky, both of Wuppertal, Fed. Rep. of Germany

[73] Assignee: Gebr. Happich GmbH, Fed. Rep. of Germany

[21] Appl. No.: 271,246

[22] Filed: Jun. 8, 1981

[30] Foreign Application Priority Data

Jun. 7, 1980 [DE] Fed. Rep. of Germany ....... 3021552

[51] Int. Cl.³ ............................................. A47B 95/02
[52] U.S. Cl. ................................ 16/111 R; 16/114 R; 16/DIG. 24
[58] Field of Search ......................... 403/405; 296/71; 16/DIG. 24, DIG. 25, DIG. 18, DIG. 19, DIG. 40, DIG. 41, 111 R, 110 R, 114 R, 113

[56] References Cited

U.S. PATENT DOCUMENTS

| 2,157,251 | 5/1939 | Tinnerman | 16/111 R |
| 2,239,798 | 4/1941 | Tinnerman | 16/114 R |
| 2,870,493 | 1/1959 | Beyrle | 16/111 R X |

FOREIGN PATENT DOCUMENTS

| 1234818 | 2/1967 | Fed. Rep. of Germany | 16/110 R |
| 1530985 | 6/1970 | Fed. Rep. of Germany | |
| 1530989 | 9/1970 | Fed. Rep. of Germany | |
| 1755749 | 12/1971 | Fed. Rep. of Germany | |
| 2200044 | 8/1972 | Fed. Rep. of Germany | |
| 2408238 | 9/1975 | Fed. Rep. of Germany | |
| 7616809 | 9/1976 | Fed. Rep. of Germany | |
| 2531368 | 2/1977 | Fed. Rep. of Germany | |
| 7813898 | 8/1978 | Fed. Rep. of Germany | |
| 62956 | 7/1968 | German Democratic Rep. | |

Primary Examiner—Mark Rosenbaum
Attorney, Agent, or Firm—Ostrolenk, Faber, Gerb & Soffen

[57] ABSTRACT

The disclosure concerns a device for fastening a handle, arm rest, or the like, to a wall in a vehicle, or the like. Two receptacles for pins are provided at spaced apart holes in the wall. A guide pin on the part is shaped so that once the guide pin is inserted in the wall, and the part is moved against the wall, the pin extends generally parallel to the wall. A locking pin is located at another location on the part and it extends straight into the wall. A pull out safety comprising two spring legs biased together against the pin prevent extraction of the locking pin. A third, retaining pin may be provided spaced from the other two pins and parallel to the locking pin for being received in yet another hole in the wall. The pull out safety is part of a clamp for the locking pin. The clamp is U-shaped and the legs of clamp hold the locking pin. The web of the clamp has a hole in it for permitting the locking pin to be shifted laterally of its length for unclamping and clamping the locking pin. The part itself has a reinforcing insert for stiffening it and the various pins may be parts of the reinforcing insert.

13 Claims, 5 Drawing Figures

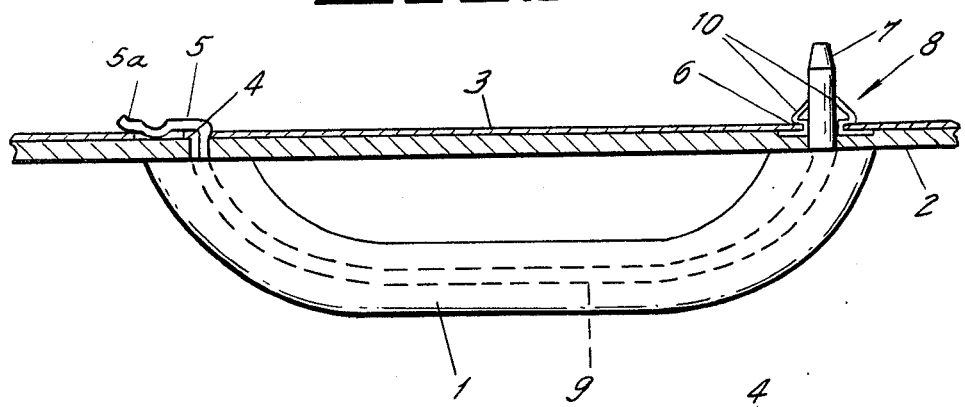
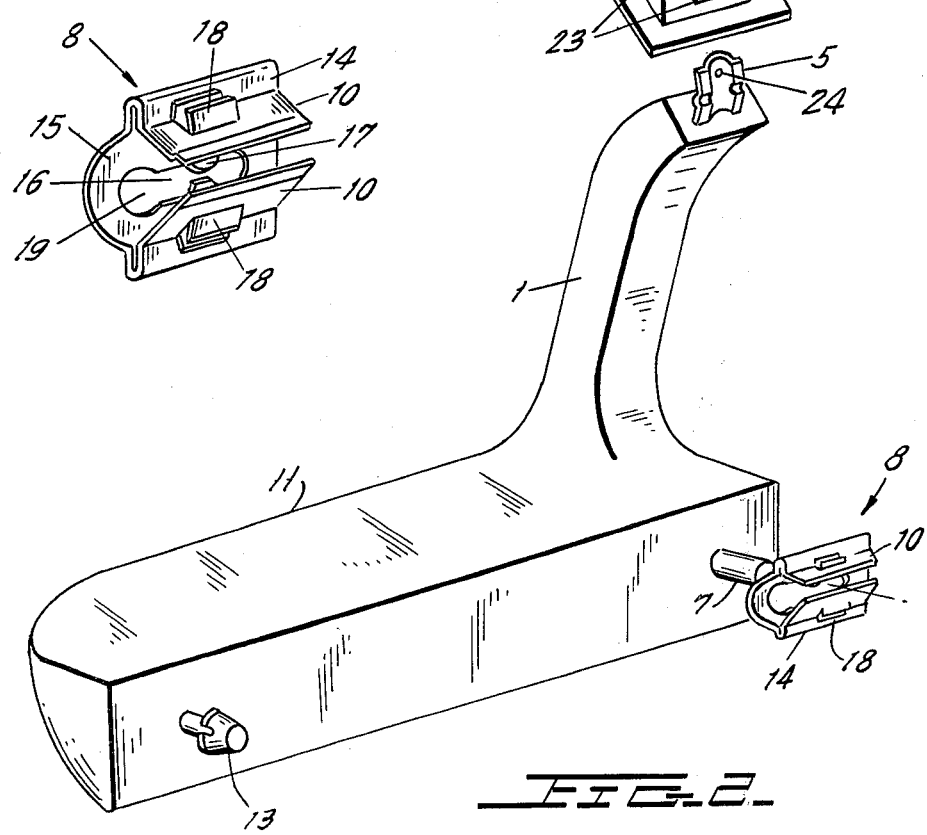

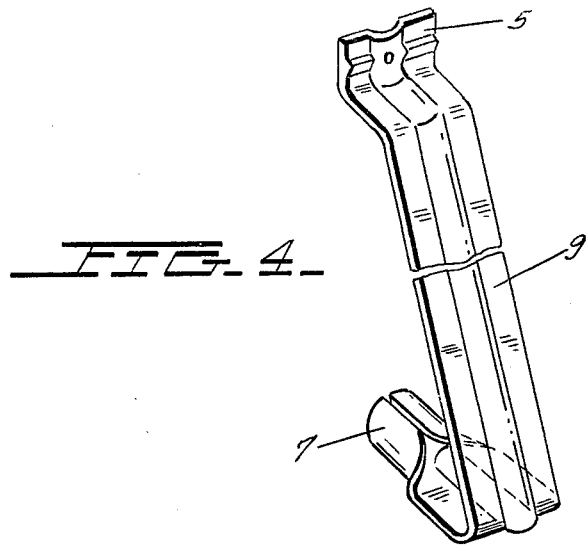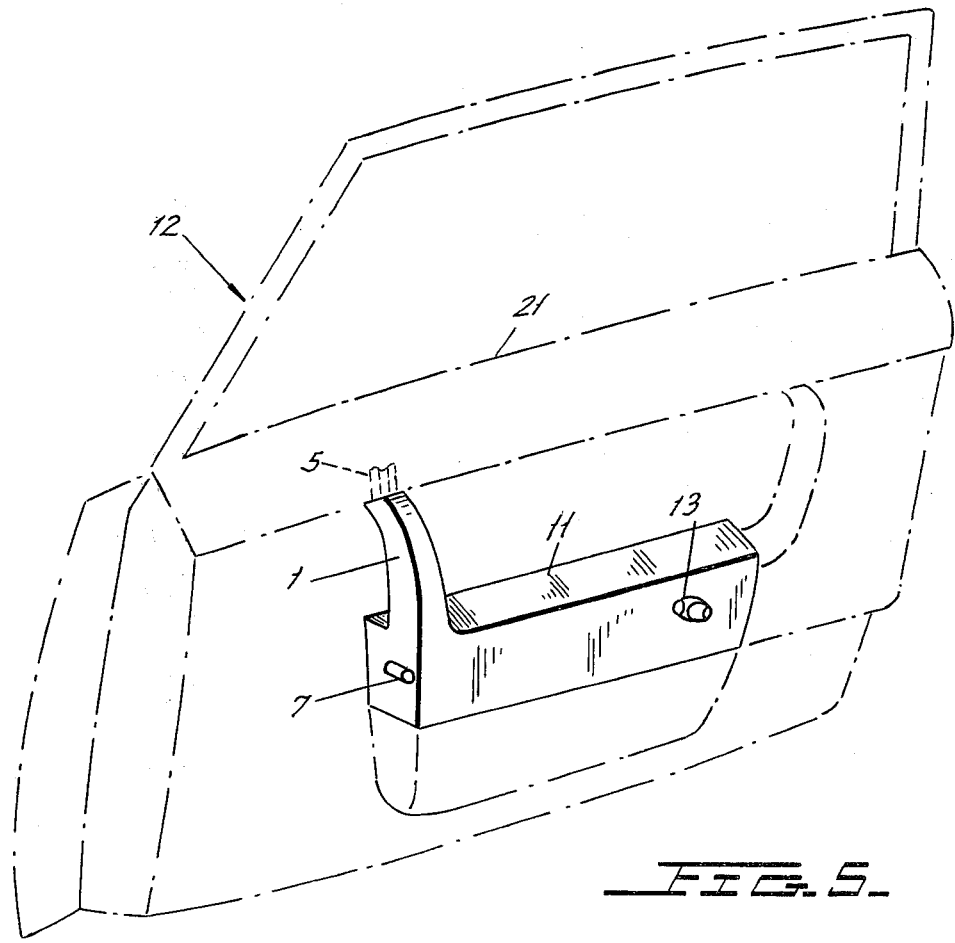

FASTENING DEVICE FOR HANDLES, ARMS RESTS ETC. ON THE WALL OF A VEHICLE, OR THE LIKE

BACKGROUND OF THE INVENTION

The present invention concerns a fastening device for fastening a handle, arm rest, or the like part to a wall of a vehicle, or the like, at two locations on the wall.

Handles, arm rests, or the like, are secured to a wall, usually by being screwed onto the wall. In order to insert a screw in the screw holes that have been provided for this, the handle must be positioned very carefully, which is cumbersome and time consuming. A disadvantage of this conventional fastening technique, however, is the considerable assembly work and resulting costs, caused by the screwing-in procedure. In a fastening device according to German Patent No. 2,408,238, the parts, i.e. handles, are fastened at least at two points. This latter connection enables a handle to be pre-mounted in a fixed position. But the final fastening of the handle must be done using screws, which requires considerable work and is therefore costly.

SUMMARY OF THE INVENTION

The object of the invention is to provide a fastening device for simpler and faster assembly of a handle, arm rest, or the like, to a wall, or the like.

The invention includes a guide pin at one connection point of the part. The guide pin is insertable into a receptacle in the wall. The guide pin may comprise an angle hook. The invention also includes at least one locking pin at a second connection point of the part. The locking pin is oriented substantially perpendicularly to the guide pin. The locking pin can likewise be inserted into its own receptacle. The locking pin receptacle is provided with a pull-out safety to prevent extraction of that pin. A handle, arm rest, or the like can be fastened at the two connection points by rapid and simple insertion of the pins into their receptacles. The guide pin is inserted into a receptacle, which is adapted in its cross-sectional area to the hook shape of the guide pin. The handle is turned in toward the body wall, and at the same time the locking pin is inserted into its respective receptacle. Due to the substantially perpendicular relative orientations of the guide pin with respect to the locking pin and the hook shape of the guide pin, the guide pin is held in the receptacle by its shape. A pull-out safety is provided only for the locking pin to secure it against extraction from its receptacle.

The invention has the advantage that insertion of the pins into the receptacles can be effected under visual checking by the installer, so it is not necessary to look for openings or to work with interposd templates. There is no need to use tools for effecting the connections. The fastening or connection points are not visible on the outside of the handle.

The pull-out safety for the locking pin has two spring legs for radially contracting over the locking pin. The spring legs diverge in the direction permitting insertion of the locking pin. The spring legs therefore do not hinder insertion of the locking pin. On the other hand, the spring legs positively prevent the locking pin from being pulled out again from the receptacle, particularly because the angular position of the spring legs is selected so that they are self-locking. In a preferred embodiment of the invention, the receptacle for the locking pin is a clamp comprised of spring steel, which is substantially U-shaped, and which has side legs in the form of diverging spring legs. The connecting web of the clamp has an oblong hole permitting the insertion therein and the lateral motion therealong of the locking pin. The spring legs of the clamp are shortened toward one side of the oblong hole so that they cannot squeeze against the locking pin in this region, whereby when the locking pin is in this region of the opening, its extraction from the clamp is eased. This clamp is relatively small and inexpensive. The special design of the clamp permits both rapid, problem free assembly of the locking pin in the receptacle by merely inserting it and extremely rapid and easy disassembly. To this end, it is only necessary to hold the locking pin, which is otherwise secured by the clamp, against motion in its axial direction, and to move that pin transverse to its longitudinal axis until it is no longer squeezed by the spring legs, after which the locking pin can be pulled out from its receptacle. In order to prevent accidental movement of the locking pin laterally along the hole to the region where it can be extracted, narrowing cams can be provided in the oblong hole, which form overridable obstacles to unintended shifting of the locking pin.

The locking pin can have a substantially smooth surface and still be positively prevented from being pulled out by the spring legs of the clamp. The smooth surface of the locking pin permits a continuous insertion width, and thus helps to bridge any tolerances. In special cases, it may be advantageous if the locking pin has locking steps, which are formed by annular grooves at spaced intervals along the locking pin or by a sawtooth profile of the locking pin. In this embodiment, it is possible to design the pull-out safety merely as a ratchet.

According to another feature of the invention, the receptacle for the locking pin can be inserted into a wall hole and be self-locking there. The self-locking mechanism can be clips on the receptacle, but it must be able to absorb the anticipated tractive forces, which can be simply achieved by a corresponding direction of insertion.

According to another embodiment of the invention, at least one additional retaining pin is arranged at a distance from both the locking pin and the guide pin, and the retaining pin is oriented to extend parallel to the locking pin, for being inserted self-locking into a separate wall hole. This retaining pin is advantageous for larger parts like arm rests combined with handles, where a two-point support is not stable enough. The retaining pin can be comprised of elastically deformable material and can terminate at its free end zone in a conically tapered portion forming a ring-shaped projection, and it can assume a clamp fit in the wall hole with a projection, after locking into the wall hole. Alternately, the retaining pin can be designed as a ratchet. In any case, the retaining pin should be self-locked so that the locking can be overcome at a certain pull-out force, so as not to hinder the desired simple disassembly of an arm rest, etc.

The receptacle for the guide pin can simply be a wall opening. Depending on the material used and the possible tolerances, rattling noises may occur. Therefore, the receptacle for the guide pin is preferably a clip embracing that pin. It is advantageous for the guide pin or the clip therefor to have cams, studs, etc. to prevent the guide pin from being pulled out. This ensures that the guide pin can not be pulled out from its receptacle during elastic deformation of the handle, arm rest, etc. The cams, studs, etc. can be readily arranged so that they do not hinder deliberate pulling out of the guide pin.

Preferably, the guide pin and/or the locking pin and/or the retaining pin are arranged to be on the part to be secured on the body wall, like a handle, arm rest, etc. If all pins of the fastening device are arranged on the part to be installed, only the wall holes have to be drilled in the body wall.

Finally, the guide pin and/or the locking pin and/or the retaining pin may be integral with a reinforcing insert which stiffens the part that is to be secured on the body wall. This permits the fastening device to be limited to a few parts and thus be simplified.

Other objects and features of the invention will be apparent from the following description and accompanying drawings.

BRIEF DESCRIPTION OF THE DRAWINGS

FIG. 1 shows a first embodiment of the fastening device for a handle.

FIG. 2 shows a second embodiment of the fastening device for an arm rest-handle combination.

FIG. 3 shows an enlarged detail of FIG. 2.

FIG. 4 shows another detail of FIG. 2.

FIG. 5 shows an installation example including the fastening device.

DESCRIPTION OF THE PREFERRED EMBODIMENTS

FIG. 1 shows a handle 1 which is secured on a body wall 3 that is covered with a padded layer 2. The handle 1 is fastened at two points, at one point through a guide pin 5 insertable into a receptacle 4 and at the other point through a locking pin 7 likewise insertable into a receptacle 6 which has a pull-out preventing safety 8. Guide pin 5 and locking pin 7 are both arranged on the handle 1 and are preferably integral with an insert 9 that stiffens handle 1. The insert may be comprised of a sheet metal strip.

Guide pin 5 is hook-shaped and includes a supporting or pull-out preventing part 5a, which extends substantially parallel to body wall 3. Locking pin 7, however, is oriented to extend substantially perpendicularly to both guide pin 5 (particularly part 5a thereof) and to body wall 3. Pull-out safety 8 holds the locking pin at this orientation. Pull-out safety 8 comprises two spring legs 10, which are supported on wall 3 at the rear side thereof and which enclose locking pin 7 between them. Spring legs 10 diverge in the direction of insertion of locking pin 7, and the distance of their free ends from each other in the unstressed state is less than the thickness or diameter of locking pin 7.

For assembly of handle 1 to wall 3, guide pin 5, 5a is first inserted into receptacle 4. Then the handle 1 is turned toward body wall 3 enabling the locking pin 7 to be inserted into receptacle 6 designed or provided with a pull-out safety 8. This also reorients the guide pin 5, 5a as illustrated, which prevents extraction of the pin. The assembly of the handle to the wall can be effected very rapidly in a simple manner. When locking pin 7 is inserted, spring legs 10 are thereby spread apart, so that locking pin 7 can pass easily through receptacle 6 until handle 1 bears on body wall 3 or its padded layer 2. Due to the spring force and the illustrated rearwardly inclined angle of spring legs 10, which angle is responsible for their self-locking, it is not possible to pull the locking pin 7 out again from safety 8, so that reliable locking of handle 1 is ensured. On the other hand, for enabling disassembly, the locking pin 7 can be brought out of engagement with spring legs 10 by moving the pin 7 transverse to its longitudinal axis.

FIG. 2 shows an arm rest 11 with an integrated handle 1. This arm rest-handle combination is particularly intended for emplacement on a door 12 of the type shown in FIG. 5. The arm rest-handle is fastened at three points, namely, over guide pin 5, already described, over locking pin 7, likewise already described, and additionally over a retaining pin 13 which can be detachably clipped into a hole (not shown) in body wall 3.

The pull-out safety 8 for the locking pin 7 in FIG. 2 comprises a clamp 14 formed of spring steel, which is shown on an enlarged scale in FIG. 3. Clamp 14 has a web 15 with side legs which are upright at the lateral edges and are inclined toward each other and which form spring legs 10 for applying force radially inwardly on locking pin 7. For the passage of locking pin 7, web 15 has an oblong laterally extended hole 16, which is narrowed at one area by cams 17. Clamp 14 can be inserted in a self-locking manner into a wall hole (not shown). The self-locking of the clamp is ensured by the locking spring arms 18 extending behind the edge zone of the wall hole, which are cut free from spring legs 10 and exposed. Oblong hole 16 has a widened opening 19 at one end. Locking pin 7 is moved into widened opening 19 by deliberate lateral displacement, which overcomes the resistance to such movement that is offered by cams 17. Then the locking pin is no longer in engagement with spring legs 10, so that it can be pulled from receptacle 6 for disassembly.

FIG. 2 shows that the receptacle 4 for the guide pin 5 can be clips 20 for embracing the guide pin. Clips 20 define a receptacle 4 which is adapted to the cross-sectional form and the curved design of guide pin 5. Clips 20 can be inserted, self-locking, into a wall hole, e.g. into a wall hole provided in crossbar 21 of the door 12 in FIG. 5. To this end, clips 20 have a flange bearing on one side thereof against body wall 3 and have detents 23, which extend behind body wall 3 in the edge zone of the wall hole.

Retaining pin 13 can be designed in the form of clips, a dowel or a ratchet and can be insertable into a hole (not shown) in body wall 3. Retaining pin 13 is designed so that it can be pulled out from its wall hole with a force which is greater than the forces normally applied on arm rest 11.

If clamp 14 and clips 20 are already preassembled, the assembly for the handle-arm rest combination is to a great extent comparable to that in FIG. 1. First guide pin 5 is inserted into receptacle 4 or clips 20 with a slight turning movement. Then both locking pin 7 and retaining pin 13 are inserted into their receptacles successively or together. For disassembly, retaining pin 13 is first removed from its receptacle. Then the entire arm rest-handle combination is turned until locking pin 7 is moved into widened opening 19, after which it can be easily pulled out from receptacle 6. Finally, guide pin 5 is removed from its receptacle 4.

Handle 1 may be subject to elastic deformation under stress, which can move guide pin 5 partly out of its receptacle 4. In order to prevent this, interlocking cams, etc. can be provided both on guide pin 5 and on clips 20. These do not, however, hinder a deliberate pull-out of the guide pin. FIG. 2 shows a stud-type cam 24 on guide pin 5.

FIG. 4 shows a reinforcing insert 9 for the handle 1 of FIG. 1. The insert is formed of a deformed sheet metal strip. It can be seen that both guide pin 5 and locking pin 7 are integral with reinforcing insert 9. Locking pin 7 is here sleeve-shaped, formed by rolling over the side edges of the insert at the respective end.

Although the present invention has been described in connection with preferred embodiments thereof, many variations and modifications will now become apparent to those skilled in the art. It is preferred, therefore, that the present invention be limited not by the specific disclosure herein, not only by the appended claims.

What is claimed is:

1. A fastening device for attaching a part to a wall, comprising:
    a first and a second receptacle for use in a wall for defining first and second connection points, respectively, for the part;
    a guide pin attached at one location on the part for being inserted into the first receptacle and the guide pin is oriented on the part so that, upon insertion of the guide pin into the first receptacle, the guide pin is oriented to extend generally along the plane of the wall in which the first receptacle is positioned;
    a locking pin attached at a second location on the part for being inserted into the second receptacle and the locking pin is oriented on the part so that, upon insertion of the locking pin into the second receptacle, the locking pin is oriented to extend generally into the wall in which the second receptacle is positioned;
    a pull out safety for blocking withdrawal of the locking pin from the second receptacle, wherein the pull out safety comprises two spring legs normally biased to squeeze against the locking pin, and the spring legs are oriented to converge against the locking pin in a direction of insertion of the locking pin, whereby the spring legs block extraction of the locking pin from the second receptacle; and wherein the second receptacle comprises a U-shaped clamp, including the two spring legs of the pull out safety as the legs of the U, and the web of the U having an oblong hole defined therein extending along the length of the space between the spring legs and through which the locking pin is passed for enabling the locking pin, which has passed through the hole, to be moved laterally of the length of the locking pin, and the spring legs being of such length toward the locking pin that at one position along the length of the oblong hole, the spring legs do not squeeze the locking pin.

2. The fastening device of claim 1, wherein the second receptacle includes means thereon for self-locking the second receptacle into the wall.

3. The fastening device of claim 1, wherein the oblong hole includes cams therein for narrowing the width of the hole for surmountably obstructing, without preventing, transverse movement of the locking pin to the one position along the hole.

4. The fastening device of claim 1, wherein the locking pin has a substantially smooth surface.

5. The fastening device of claim 1, wherein the locking pin has a profile that is stepped longitudinally along its length for enabling grasping of the locking pin by the spring legs.

6. The fastening device of claim 1, wherein the locking pin is oriented generally transverse to the guide pin.

7. The fastening device of claim 6, wherein the locking pin is oriented generally perpendicularly to the guide pin.

8. The fastening device of claim 1 or claim 6, further comprising a retaining pin located on the part and spaced from the guide pin and from the locking pin; and the retaining pin extending parallel to the locking pin and being insertable into a respective hole defined in the wall.

9. The fastening device of claim 8, wherein the retaining pin is comprised of elastically deformable material; the retaining pin having a free end region which terminates in a conical taper, and the conical taper forming a ring-shaped projection which forms a clamp fit in the respective hole in the wall.

10. The fastening device of claim 8, wherein the part includes a reinforcing insert for stiffening the part; at least one of the locking pin, guide pin and retaining pin being part of the insert.

11. The fastening device of claim 1 or claim 6, wherein the first receptacle comprises a clip for engaging the guide pin, and the clip being attachable to the wall in a respective hole in the wall.

12. The fastening device of claim 11, wherein the guide pin and the clip have cooperating means for preventing extraction of the guide pin from the first receptacle.

13. The fastening device of claim 1 or claim 6, wherein the part includes a reinforcing insert for stiffening the part; at least one of the locking pin and the guide pin being part of the insert.

* * * * *